(12) United States Patent
Markert

(10) Patent No.: US 12,624,745 B2
(45) Date of Patent: May 12, 2026

(54) ECCENTRIC OSCILLATION TYPE SPEED REDUCER

(71) Applicant: SUMITOMO HEAVY INDUSTRIES, LTD., Tokyo (JP)

(72) Inventor: Sebastian Markert, Markt Indersdorf (DE)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/974,879

(22) Filed: Dec. 10, 2024

(65) Prior Publication Data

US 2025/0189013 A1 Jun. 12, 2025

(30) Foreign Application Priority Data

Dec. 11, 2023 (JP) ................................. 2023-208428

(51) Int. Cl.
*F16H 1/32* (2006.01)
*F16H 57/01* (2012.01)

(52) U.S. Cl.
CPC ............... *F16H 1/32* (2013.01); *F16H 57/01* (2013.01); *F16H 2001/323* (2013.01)

(58) Field of Classification Search
CPC ................. F16H 1/32; F16H 2001/323; F16H 2001/325; F16H 57/01
See application file for complete search history.

(56) References Cited

U.S. PATENT DOCUMENTS

| | | | | |
|---|---|---|---|---|
| 8,880,267 B2 * | 11/2014 | Ozaki | ......................... | B60L 3/12 701/22 |
| 10,693,349 B2 * | 6/2020 | Tamura | ................... | H02K 15/00 |
| 11,607,800 B2 * | 3/2023 | Zhang | .................... | B25J 13/085 |
| 2022/0302798 A1 * | 9/2022 | Markert | ................. | H02K 7/083 |
| 2023/0008068 A1 * | 1/2023 | Pointner | ................. | F16H 57/01 |
| 2024/0337313 A1 * | 10/2024 | Okazaki | .................... | G01L 1/22 |

FOREIGN PATENT DOCUMENTS

| | | | | |
|---|---|---|---|---|
| JP | 4267368 B2 | 5/2009 | | |
| JP | 2023-99960 A | 7/2023 | | |
| JP | 2023099959 A | * 7/2023 | ............... | F16H 1/32 |
| WO | WO-2021193244 A1 | * 9/2021 | ........... | F16H 49/001 |

OTHER PUBLICATIONS

Search Report issued in European Application No. 24214082.0-1009, mailed Apr. 4, 2025.

* cited by examiner

*Primary Examiner* — Sherry L Estremsky

(74) *Attorney, Agent, or Firm* — Michael Best & Friedrich LLP

(57) ABSTRACT

An eccentric oscillation type speed reducer includes: an eccentric body; an external gear capable of being oscillated by the eccentric body; an internal gear that meshes with the external gear; and a carrier capable of being synchronized with an axial rotation component of the external gear, in which one of the internal gear and the carrier configures at least a part of a fixed body that is fixed to an external member, the fixed body includes a first ring portion, a second ring portion that is provided to be separated from the first ring portion in a radial direction and is fixed to the external member, and a distortion generating portion provided between the first ring portion and the second ring portion, and a strain sensor is installed in the distortion generating portion.

7 Claims, 9 Drawing Sheets

PROCESSING
DEVICE

ECCENTRIC OSCILLATION TYPE SPEED REDUCER

CROSS-REFERENCE TO RELATED APPLICATIONS

This application claims priority to Japanese Patent Application No. 2023-208428, filed on Dec. 11, 2023, which is incorporated by reference herein in its entirety.

BACKGROUND

Technical Field

Certain embodiments of the present invention relate to an eccentric oscillation type speed reducer.

Description of Related Art

The related art discloses an eccentric oscillation type speed reducer that includes an eccentric body, an external gear that is oscillated by the eccentric body, an internal gear that meshes with the external gear, and a carrier that is synchronized with an axial rotation component of the external gear.

SUMMARY

According to an embodiment of the present invention, there is provided an eccentric oscillation type speed reducer including: an eccentric body; an external gear that is oscillated by the eccentric body; an internal gear that meshes with the external gear; and a carrier that is synchronized with an axial rotation component of the external gear, in which one of the internal gear and the carrier configures at least a part of a fixed body that is fixed to an external member, the fixed body includes a first ring portion, a second ring portion that is provided to be separated from the first ring portion in a radial direction and is fixed to the external member, and a distortion generating portion provided between the first ring portion and the second ring portion, and a strain sensor is installed in the distortion generating portion.

BRIEF DESCRIPTION OF THE DRAWINGS

FIG. 2 is an exploded perspective view showing a synchronous carrier of one embodiment together with a peripheral structure.

FIG. 3 is a front view showing the synchronous carrier of one embodiment.

DETAILED DESCRIPTION

Figure 1:
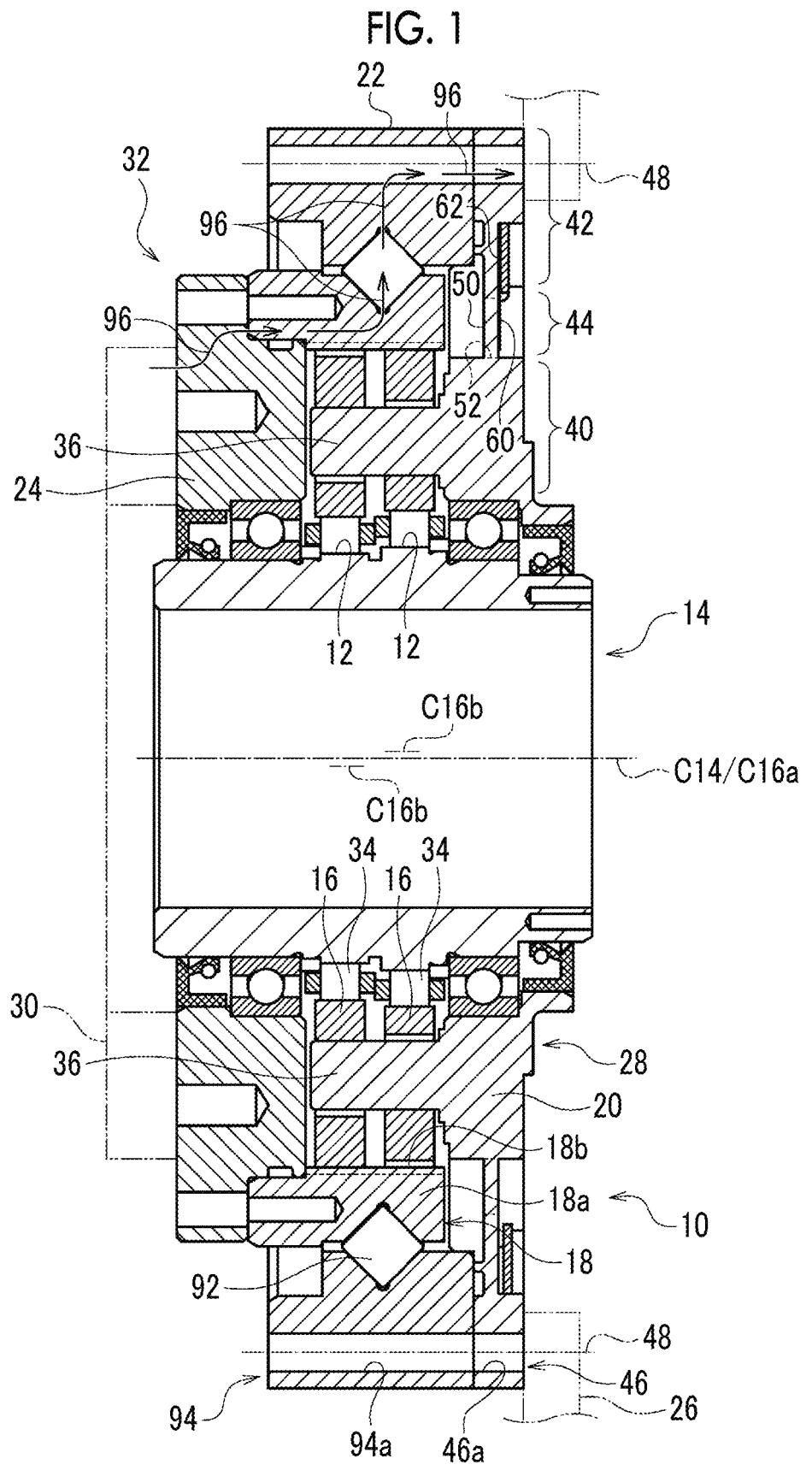
FIG. 1 is a side sectional view showing an eccentric oscillation type speed reducer according to one embodiment.

In the eccentric oscillation type speed reducer, there is a case where it is required to detect torque that acts on a constituent member thereof.

It is desirable to provide an eccentric oscillation type speed reducer capable of detecting torque that acts on a constituent member.

Embodiments for implementing an eccentric oscillation type speed reducer (hereinafter, also referred to as a speed reducer) of the present disclosure will be described. Identical or equivalent elements will be denoted by the same reference numerals and the repeated description thereof will be omitted. In each drawing, for convenience of description, the components are appropriately omitted, enlarged, or reduced. The drawings shall be viewed according to the directions of the symbols.

One Embodiment

FIG. 1 is referred to. A speed reducer 10 includes a crankshaft 14 having at least one eccentric body 12, an external gear 16 capable of being oscillated by the eccentric body 12, an internal gear 18 that meshes with the external gear 16, a synchronous carrier 20 capable of being synchronized with an axial rotation component of the external gear 16, a casing 22 that is disposed outside the external gear 16 in a radial direction, and an asynchronous carrier 24 provided on a side opposite to the synchronous carrier 20 in an axial direction with respect to the external gear 16. In the present embodiment, a center crank type eccentric oscillation type speed reducer 10 will be described. In the speed reducer 10 of this type, the crankshaft 14 is disposed on an oscillation center C16a of the external gear 16. Hereinafter, the direction along the oscillation center C16a of the external gear 16 will be referred to as an axial direction, and the radial direction and the circumferential direction centered on the oscillation center C16a will be referred to as a radial direction and a circumferential direction.

The speed reducer 10 includes a fixed body 28 that is fixed to an external member 26, and an output body 32 that outputs rotation to an external driven member 30. Here, an example in which the synchronous carrier 20 and the casing 22 configure the fixed body 28 and the internal gear 18 and the asynchronous carrier 24 configure the output body 32 will be described. The external member 26 is provided outside the speed reducer 10 and supports the speed reducer 10. The driven member 30 is provided outside the speed reducer 10 and is driven by the output of the output body 32. The driven member 30 is, for example, a part of each of various machines such as industrial machines (machine tools, construction machines, or the like), robots (industrial robots, service robots, or the like), and transport equipment (conveyors, vehicles, or the like). When rotation is input from a drive source (not shown) to the crankshaft 14, the output body 32 outputs the rotation decelerated more than the rotation of the crankshaft 14 to the driven member 30. The drive source is, for example, a motor. However, in addition to the motor, a gear motor, an engine, or the like may be used as the drive source.

The eccentric body 12 has a circular shape eccentric with respect to a rotation center line C14 of the crankshaft 14. The eccentric body 12 can oscillate the external gear 16 by rotating around the rotation center line C14 of the crankshaft 14. Here, the term "oscillation" means that a gear center C16b of the external gear 16 rotates around the oscillation center C16a. The number of the eccentric bodies 12 is not particularly limited, and one or three or more eccentric bodies 12 may be provided.

The external gear 16 is individually provided to correspond to each of the plurality of eccentric bodies 12, and is supported by a corresponding eccentric body 12 via an eccentric bearing 34. The internal gear 18 includes an internal gear main body 18a and a plurality of inner teeth 18b provided in an inner peripheral portion of the internal gear main body 18a and meshing with the external gear 16. The plurality of inner teeth 18b may be integrally provided by the same member as the internal gear main body 18a, or may be configured by a plurality of pins that are rotatably supported by the internal gear main body 18a.

A pin 36 protrudes in the axial direction from the synchronous carrier 20. A plurality of pins 36 are provided at intervals in the circumferential direction. The pin 36 may be configured by the same member as the synchronous carrier 20, or may be configured by a member different from the synchronous carrier 20. The pin 36 penetrates the external gear 16 in the axial direction, and can receive a load from the external gear 16 when the external gear 16 oscillates.

The expression, the synchronous carrier 20 is "synchronized with the axial rotation component of the external gear 16", means that the axial rotation component of the synchronous carrier 20 is maintained at the same magnitude as the axial rotation component of the external gear 16 within a numerical range including zero. For example, in a case where, as in the present embodiment, the internal gear 18 serves as the output body 32 and the synchronous carrier 20 serves as the fixed body 28, the internal gear 18 rotates during the operation of the speed reducer 10. In this case, the synchronous carrier 20 is fixed to the external member 26, so that the axial rotation component of the synchronous carrier 20 is maintained at zero. In addition, the rotation of the external gear 16 is restrained by the synchronous carrier 20 and the pin 36. In this manner, the axial rotation component of the external gear 16 is also maintained at zero. As a result, the axial rotation component of the synchronous carrier 20 is synchronized with the axial rotation component of the external gear 16. In contrast, in a case where the internal gear 18 serves as the fixed body 28 and the synchronous carrier 20 serves as the output body 32, the external gear 16 rotates during the operation of the speed reducer 10. The axial rotation component of the external gear 16 is transmitted to the synchronous carrier 20 via the pin 36. In this way, the synchronous carrier 20 rotates with the axial rotation component having the same magnitude as the axial rotation component of the external gear 16, and thus is synchronized with the axial rotation component of the external gear 16.

The asynchronous carrier 24 is not connected to the synchronous carrier 20, and is not synchronized with the axial rotation component of the synchronous carrier 20 during the operation of the speed reducer 10. As in the present embodiment, a case where the synchronous carrier 20 serves as the fixed body 28 and the axial rotation component thereof is maintained at zero is considered. In this case, the asynchronous carrier 24 serves as the output body 32 and rotates, and thus the asynchronous carrier 24 is not synchronized with the axial rotation component of the synchronous carrier 20. In contrast, a case where the synchronous carrier 20 serves as the output body 32 and rotates is considered. In this case, the asynchronous carrier 24 serves as the fixed body 28 and maintains the axial rotation component at zero, and thus the asynchronous carrier 24 is not synchronized with the axial rotation component of the synchronous carrier 20.

The casing 22 of the present embodiment is provided separately from the internal gear 18. The casing 22 of the present embodiment is fixed to the synchronous carrier 20 by a fixture such as a bolt (not shown) to be integrated with the synchronous carrier 20.

An example of the operation of the speed reducer 10 described above will be described. When rotation is input from the drive source to the crankshaft 14, the eccentric body 12 of the crankshaft 14 causes the external gear 16 to oscillate. In a case where the external gears 16 oscillate, the meshing position between the external gears 16 and the internal gear 18 change in the circumferential direction. Accordingly, one (here, the internal gear 18) of the external gear 16 and the internal gear 18 rotates each time the crankshaft 14 rotates once. The output body 32 is rotated by the axial rotation component of one of the external gear 16 and the internal gear 18, and outputs rotation to the driven member 30. In this case, the output body 32 outputs the rotation decelerated at a reduction ratio corresponding to a difference in the number of teeth between the external gear 16 and the internal gear 18 with respect to the rotation input to the crankshaft 14 to the driven member 30.

Figure 2:
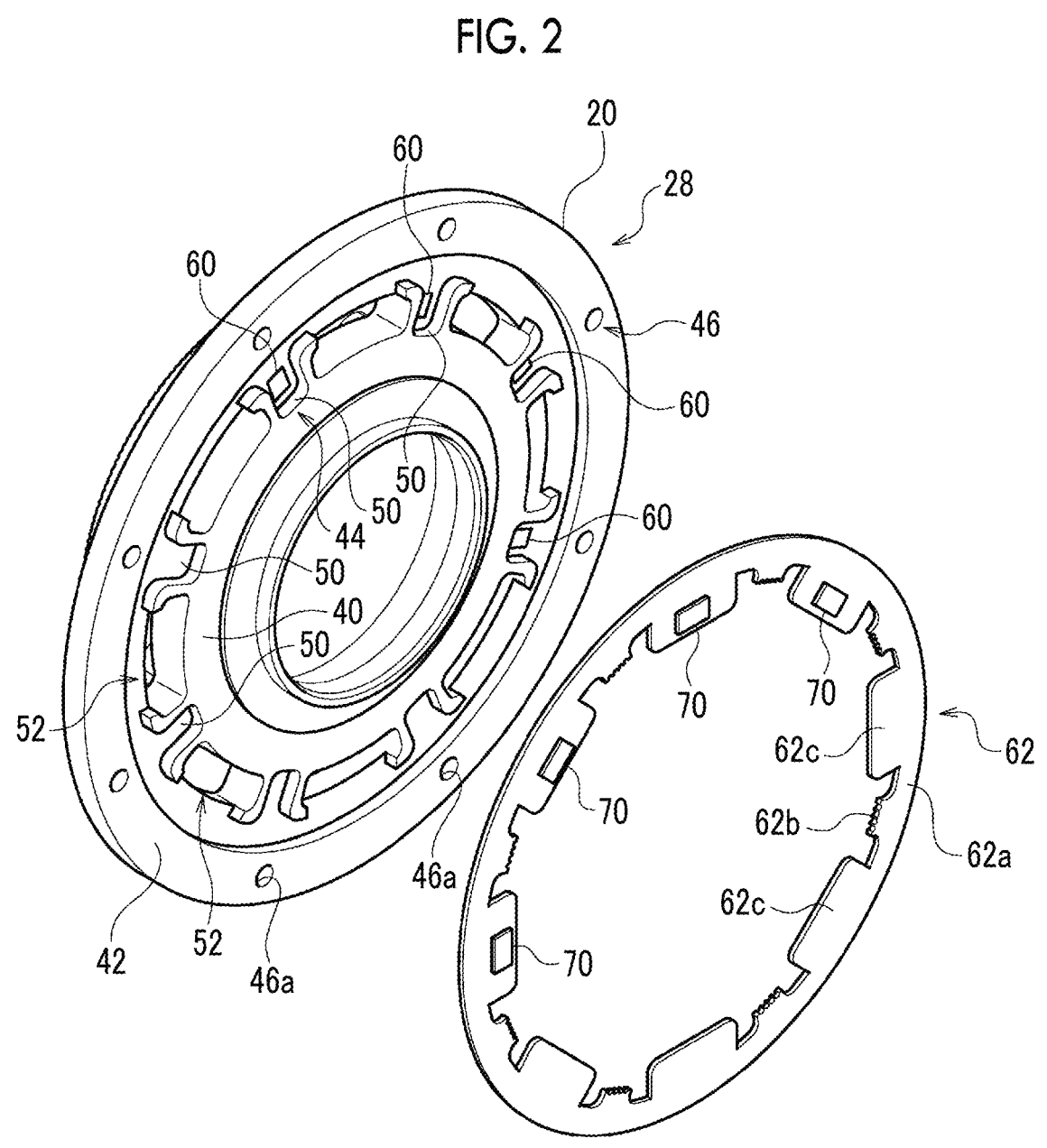
Figure 3:
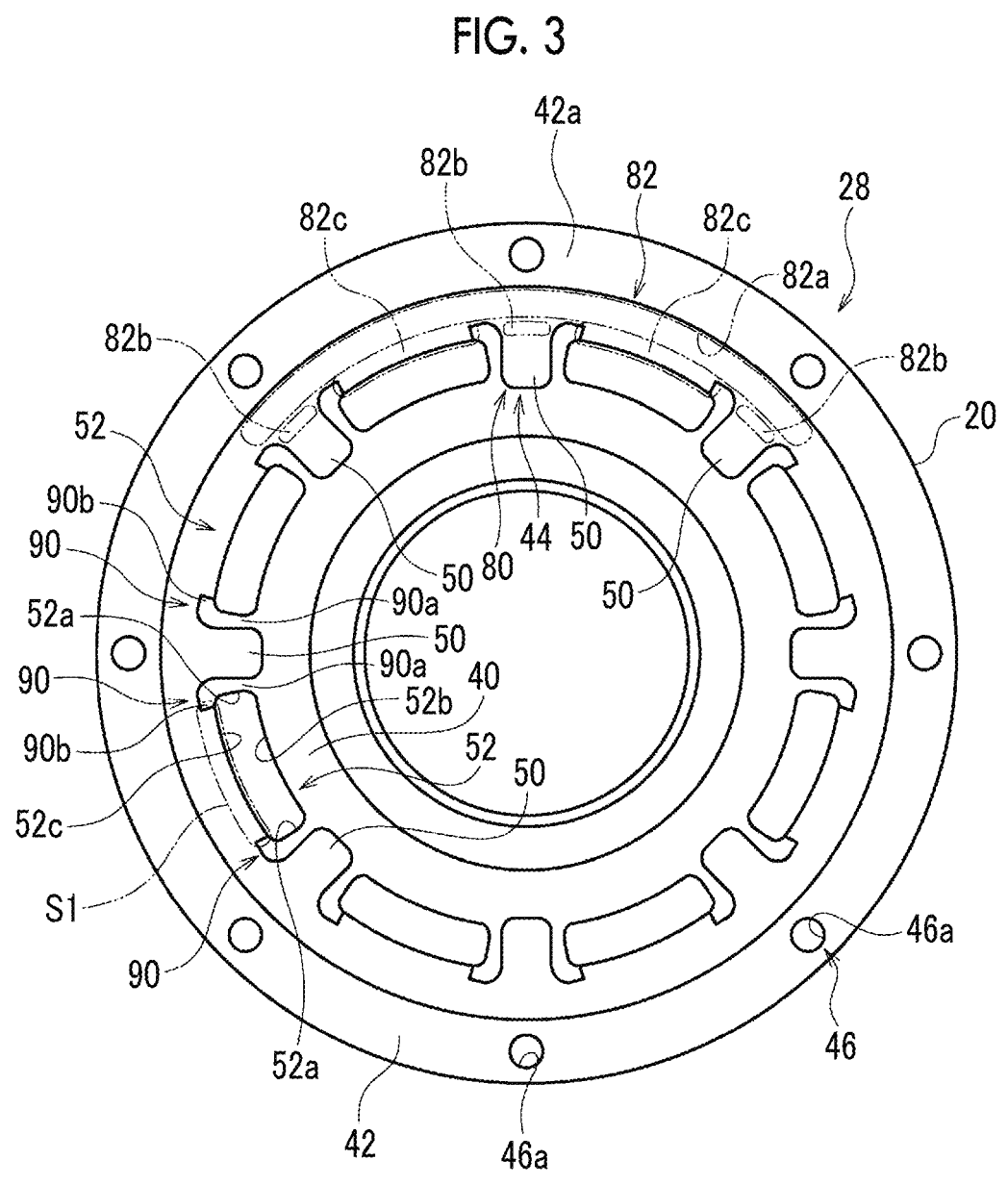

FIGS. 1 to 3 are referred to. The speed reducer 10 includes a strain sensor 60 that is installed in a distortion generating portion 44 (to be described later) of the fixed body 28, and a circuit board 62 that is electrically connected to the strain sensor 60. In addition to these, the speed reducer 10 has a feature regarding the structure of the fixed body 28.

The fixed body 28 includes a first ring portion 40, a second ring portion 42 that is provided to be separated from the first ring portion 40 in the radial direction and is fixed to the external member 26, and the distortion generating portion 44 that is provided between the first ring portion 40 and the second ring portion 42. The first ring portion 40, the second ring portion 42, and the distortion generating portion 44 of the present embodiment are provided in the synchronous carrier 20. In the present embodiment, these are provided in a single member configuring the synchronous carrier 20.

The first ring portion 40 has a ring shape. The second ring portion 42 has a ring shape. The first ring portion 40 of the present embodiment serves as an inner ring portion provided on the inner side in the radial direction, and the second ring portion 42 serves as an outer ring portion provided on the outer side in the radial direction.

Torque is input to the first ring portion 40 during the operation of the speed reducer 10. Specifically, the torque is transmitted from any one of the external gear 16 and the internal gear 18 during the operation of the speed reducer 10, thereby being input to the first ring portion 40. A case where the synchronous carrier 20 is at least a part of the fixed body 28, as in the present embodiment, is considered. In this case, the torque transmitted from the external gear 16 is input to the first ring portion 40 of the fixed body 28 via the pin 36. In contrast, as in the embodiment of FIG. 7 described later, a case where the internal gear 18 is at least a part of the fixed body 28 is considered. In this case, the torque transmitted from the inner teeth 18b of the internal gear 18 is input to the first ring portion 40 of the fixed body 28.

The second ring portion 42 includes a first fixation portion 46 that is fixed to the external member 26. The first fixation portion 46 of the present embodiment is directly fixed to the external member 26 by a fixture 48 such as a bolt. In FIG. 1, only the center line of the bolt serving as the fixture 48 is shown. In FIG. 1, only the center line is shown for a use location of the other bolt in the same manner. First through-holes 46a for the fixtures 48 are formed in the first fixation portion 46 of the present embodiment at intervals in the circumferential direction. In addition, the first fixation portion 46 may be fixed to the external member 26 via another constituent member (for example, the casing 22) of the fixed body 28.

The distortion generating portion 44 connects the first ring portion 40 and the second ring portion 42. The distortion generating portion 44 is deformable while transmitting the torque transmitted to the first ring portion 40 to the second ring portion 42. In a case where such torque is applied, the distortion generating portion 44 is configured to be deformable in the circumferential direction more than the first ring portion 40 and the second ring portion 42. It can be said that the amount of deformation of the distortion generating portion 44 in the circumferential direction is larger than those of the first ring portion 40 and the second ring portion 42.

In order to increase the amount of deformation of the distortion generating portion 44 in this manner, the distortion generating portion 44 of the present embodiment is configured by a plurality of pillar portions 50 provided at intervals in the circumferential direction. A specific example for increasing the amount of deformation of the distortion generating portion 44 in this manner is not particularly limited. In order to realize this, for example, the distortion generating portion 44 may have a reduced axial dimension with respect to both the first ring portion 40 and the second ring portion 42. In this case, the distortion generating portion 44 may have a ring shape that is continuous in the circumferential direction.

The plurality of pillar portions 50 of the present embodiment are provided to extend radially when viewed in the axial direction. A specific shape of the pillar portion 50 is not particularly limited. For example, the pillar portion 50 may have a linear shape, a curved shape, a crank shape, or the like when viewed in the axial direction.

The fixed body 28 includes an axial through-hole 52 formed between the pillar portions 50 adjacent to each other. The axial through-hole 52 penetrates the fixed body 28 in the axial direction. In the present embodiment, a plurality of axial through-holes 52 are formed at intervals in the circumferential direction. The axial through-hole 52 includes a pair of circumferential side portions 52a configured by the pillar portions 50 adjacent to each other, and a pair of radial side portions 52b and 52c configured by the first ring portion 40 and the second ring portion 42. The pair of radial side portions 52b and 52c include an inner radial side portion 52b that is configured by an outer peripheral portion of the ring portion 40 located on the inner side in the radial direction, and an outer radial side portion 52c that is configured by an inner peripheral portion of the ring portion 42 located on the outer side in the radial direction.

Figure 4:
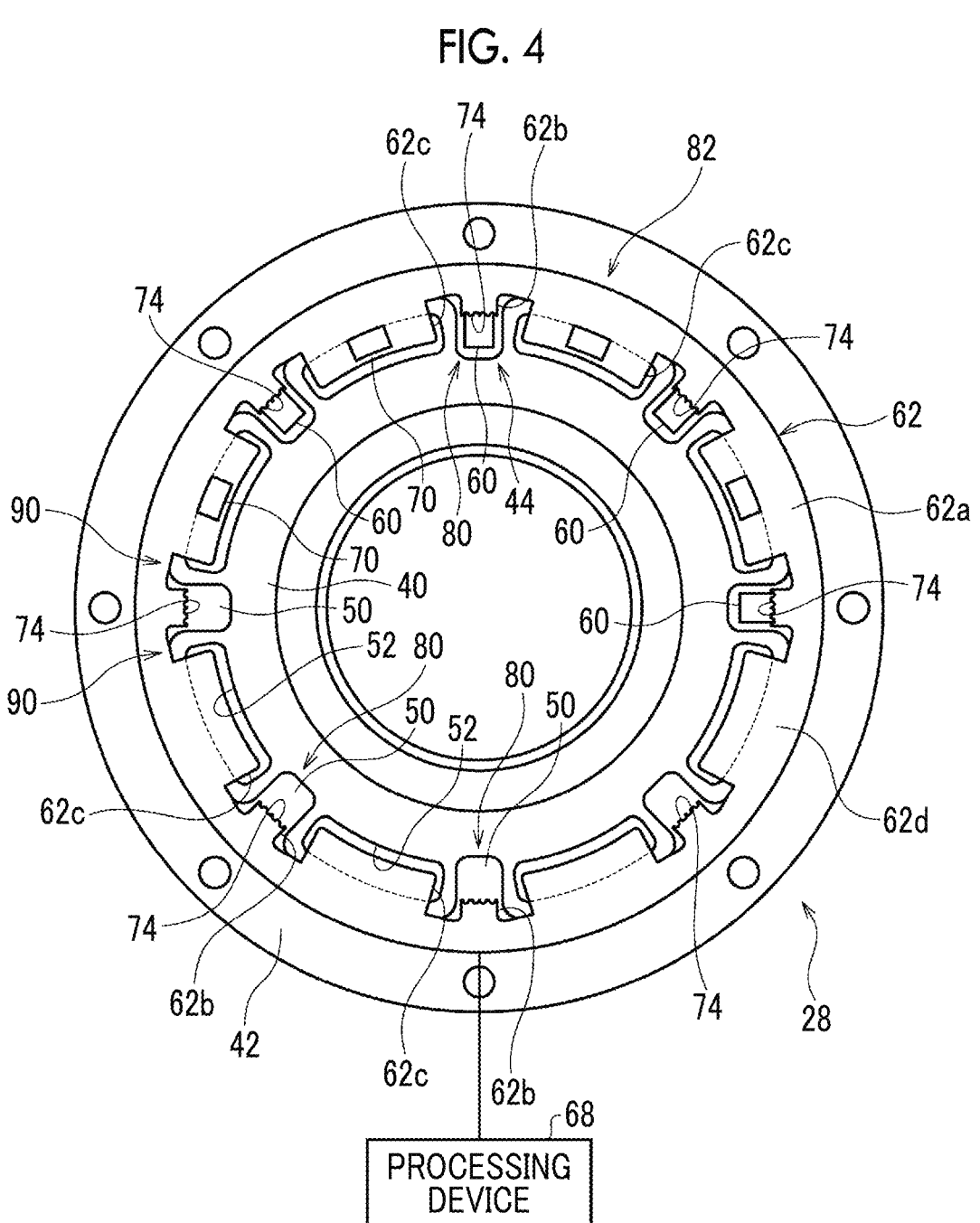
FIG. 4 is a front view showing the synchronous carrier of one embodiment together with the peripheral structure.
Figure 5:
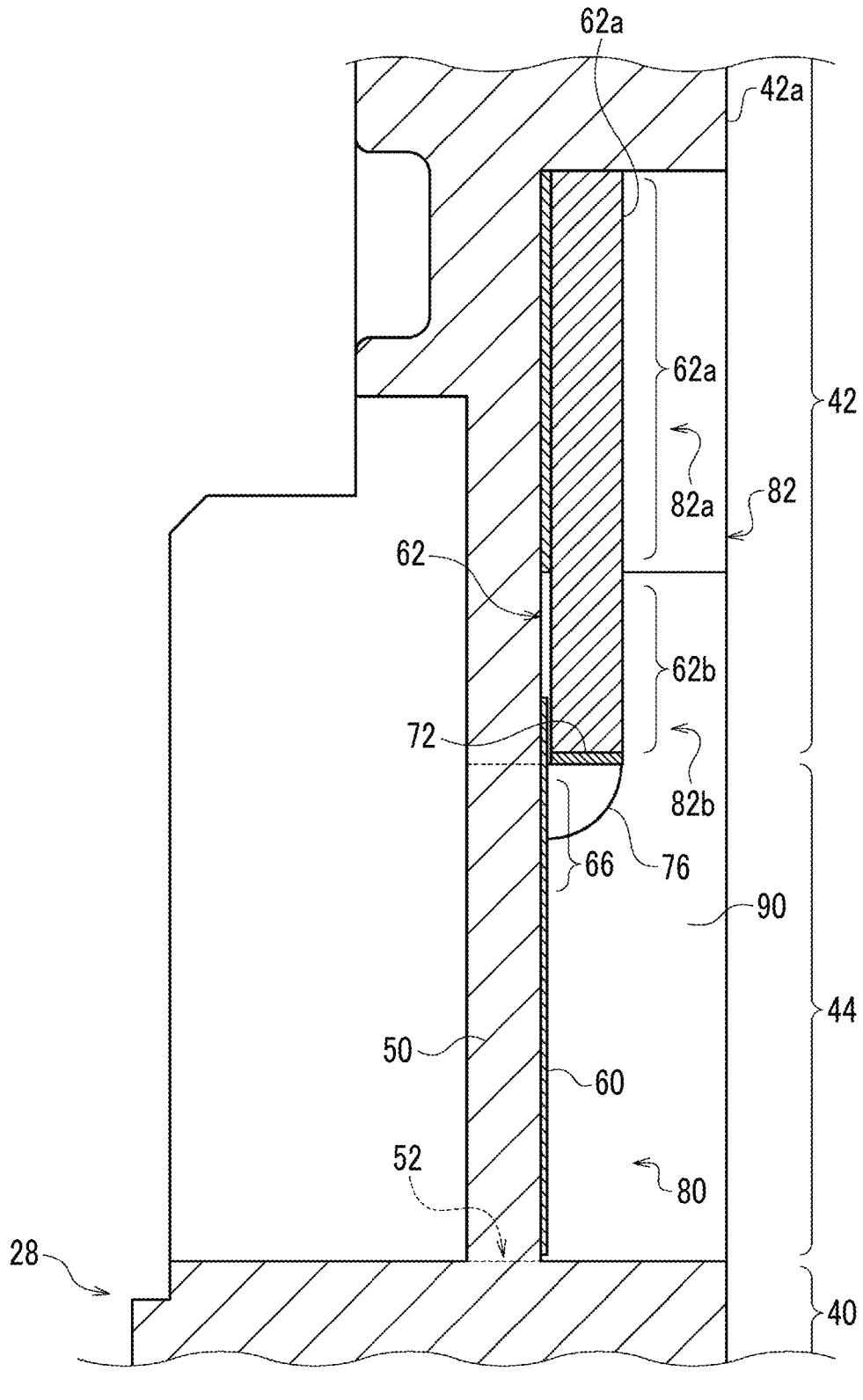
FIG. 5 is an enlarged view showing a strain sensor of FIG. 1.
Figure 6:
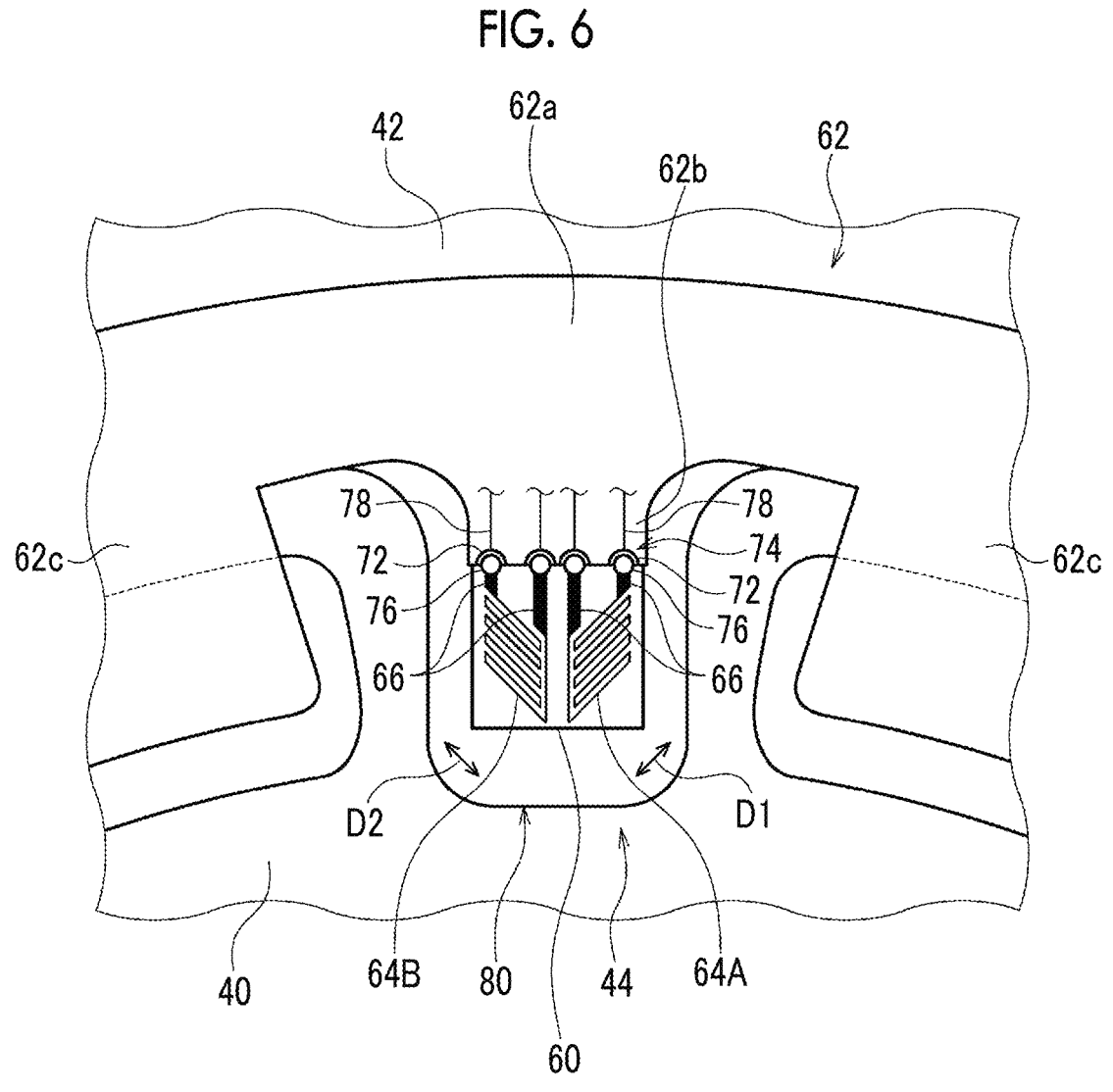
FIG. 6 is an enlarged view showing the strain sensor of FIG. 4.

FIGS. 4, 5, and 6 are referred to. The strain sensor 60 is used to detect the torque that acts on the fixed body 28. The strain sensor 60 is installed on the axial side surface of the distortion generating portion 44 by adhesion or the like. The strain sensor 60 detects an electrical signal corresponding to the strain when the distortion generating portion 44 of the fixed body 28 is deformed. The electrical signal detected by the strain sensor 60 indicates the strain of the distortion generating portion 44. The strain sensor 60 of the present embodiment detects an electrical signal indicating shear strain of the distortion generating portion 44 in a direction perpendicular to the axial direction.

The strain sensor 60 of the present embodiment is a strain gauge. However, a specific example thereof is not particularly limited. The strain gauge may be a uniaxial gauge using a single gauge element made of a resistance wire, or a multiaxial gauge such as a rosette gauge using a plurality of gauge elements. Here, a biaxial gauge using two gauge elements 64A and 64B is exemplified as the strain gauge. However, a specific example is not particularly limited. The gauge elements 64A and 64B are deformed together with the distortion generating portion 44 of the fixed body 28 to detect an electrical signal indicating a strain in a detection direction corresponding to each of the gauge elements 64A and 64B. The gauge elements 64A and 64B of the present embodiment include a first gauge element 64A for detecting the shear strain in a first detection direction D1, and a second gauge element 64B for detecting the shear strain in a second detection direction D2 perpendicular to the first detection direction D1.

The strain sensor 60 includes a sensor electrode 66 for outputting the detected electrical signal. The sensor electrode 66 of the present embodiment is a pad electrode provided on the main surface (axial side surface) of the strain sensor 60. However, a specific example thereof is not particularly limited. The sensor electrodes 66 of the present embodiment are individually provided to correspond to each of the gauge elements 64A and 64B, and are provided at both end portions of each of the gauge elements 64A and 64B.

In the present embodiment, a plurality of strain sensors 60 are installed at intervals in the circumferential direction. Specifically, in the present embodiment, a total of four strain sensors 60 are installed at intervals in the circumferential direction. The strain sensors 60 are wired to configure a bridge circuit (not shown) in accordance with a predetermined wiring method (one-gauge method, two-gauge method, four-gauge method, or the like). Here, a wiring method such as the four-gauge method using four strain sensors 60 is exemplified. In addition to this, as the wiring method, a one-gauge method using one strain sensor 60, a two-gauge method using two strain sensors 60, or the like may be used. The number and the disposition position of the strain sensors 60 are not limited thereto, and may be appropriately changed.

The strain sensor 60 is electrically connected to a processing device 68 for detecting the torque via the circuit board 62. The processing device 68 is, for example, a combination of a CPU, a ROM, and a RAM, such as a microcomputer, and is configured by, for example, a processing chip or the like. The processing device 68 may be mounted on the circuit board 62, or may be present outside the speed reducer 10.

The strain sensor 60 outputs an electrical signal indicating the strain of the distortion generating portion 44 to the processing device 68 via the bridge circuit described above. The processing device 68 can detect the torque acting on the fixed body 28 by processing the electrical signal output from the strain sensor 60. As a processing method for detecting torque from an electrical signal of the strain sensor 60, in addition to a known method, a method that can be used in the future may be used and a detailed description thereof will be omitted.

A circuit element 70 that is used to process the electrical signal of the strain sensor 60 is mounted on the circuit board 62. The circuit element 70 is, for example, an amplifier that amplifies the electrical signal of the strain sensor 60, a processing chip that configures the processing device 68, an A/D converter, or the like. The circuit element 70 is mounted on a mounting surface 62d provided on the main surface of the circuit board 62.

The circuit board 62 includes a plurality of substrate electrodes 72 for electrically connecting the circuit board 62 to the strain sensor 60. The substrate electrode 72 of the present embodiment is an end surface through-hole electrode provided on an end surface (a tip end surface of a first protrusion portion 62b to be described later) of the circuit board 62. The type of the substrate electrode 72 is not particularly limited, and may be a pad electrode provided on the main surface of the circuit board 62. The plurality of substrate electrodes 72 configure an electrode group 74 including a plurality of (here, four) substrate electrodes 72. The circuit board 62 of the present embodiment includes a plurality of sets of electrode groups 74. The plurality of sets of electrode groups 74 are provided at intervals in the circumferential direction of the circuit board 62. The electrode group 74 corresponds to one strain sensor 60, and each of the substrate electrodes 72 belonging to the electrode group 74 is electrically connected to each of the sensor electrodes 66 of a corresponding strain sensor 60. The number and positions of the sensor electrodes 66 and the substrate electrodes 72 are not particularly limited.

The strain sensor 60 and the circuit board 62 are electrically connected to each other via a conductive connection material 76 that is in contact with the strain sensor 60 and the circuit board 62. Specifically, the sensor electrode 66 of the strain sensor 60 and the substrate electrode 72 of the circuit board 62 to be electrically connected to each other are electrically connected to each other via the conductive connection material 76 that is in contact with the sensor electrode 66 and the substrate electrode 72. The conductive connection material 76 of the present embodiment is solder, but may be a conductive resin or the like, in addition to solder. The circuit board 62 and the strain sensor 60 of the present embodiment are directly connected to each other by the conductive connection material 76, but may be connected to each other by using a wire such as a bonding wire and the conductive connection material 76. An electrical signal that is output from the strain sensor 60 sequentially passes through the substrate electrode 72 of the circuit board 62 and a conductor pattern 78 (refer to FIG. 6) of the circuit board 62, and is sent to other locations such as the circuit element 70.

The effects of the speed reducer 10 described above will be described.

(A) When torque is input to the first ring portion 40 during the operation of the speed reducer 10, the distortion generating portion 44 of the fixed body 28 is deformed while transmitting the torque. The strain sensor 60 is installed in the distortion generating portion 44 of the fixed body 28. Therefore, the torque acting on the fixed body 28 can be detected by using the electrical signal corresponding to the strain of the distortion generating portion 44 detected by the strain sensor 60.

As described above, the processing device 68 processes the electrical signal, whereby the torque can be detected. In providing the eccentric oscillation type speed reducer 10 capable of detecting the torque, the processing device 68 is not essential, and the speed reducer 10 does not need to include the processing device 68.

The distortion generating portion 44 of the fixed body 28 is configured to be more deformable than each of the ring portions 40 and 42 of the fixed body 28, and is likely to increase the strain when the torque acts. By installing the strain sensor 60 at a location where the strain is likely to be increased, the electrical signal that is detected by the strain sensor 60 can be increased as compared to a case where the strain sensor 60 is installed on each of the ring portions 40 and 42 of the fixed body 28. As a result, compared to such a case, even though the torque acting on the first ring portion 40 of the fixed body 28 is small, the torque can be easily detected by using the electrical signal.

Next, other features of the speed reducer 10 of the present embodiment will be described. FIGS. 3 and 5 are referred to. The distortion generating portion 44 of the fixed body 28 includes a first recessed portion 80 that accommodates the strain sensor 60. The first recessed portion 80 is provided on the axial side surface of the fixed body 28. The first recessed portion 80 is provided between the first ring portion 40 and the second ring portion 42, and is recessed in the axial direction with respect to the axial side surface of at least one (here, the first ring portion 40) of the first ring portion 40 and the second ring portion 42. The first recessed portion 80 of the present embodiment is also recessed in the axial direction with respect to the axial side surface of a reinforcement portion 90 provided in the distortion generating portion 44 to be described later. The strain sensor 60 is installed on a bottom surface portion of the first recessed portion 80 by using adhesion or the like.

One of the first ring portion 40 and the second ring portion 42 of the fixed body 28 includes a second recessed portion 82 that accommodates at least a part of the circuit board 62. The second recessed portion 82 is provided on the axial side surface of the fixed body 28. The second recessed portion 82 of the present embodiment is provided on the axial side surface of the second ring portion 42, and is recessed in the axial direction with respect to an axial outer side surface 42a of the second ring portion 42 that is located on the outer side in the axial direction with respect to the second recessed portion 82. The circuit board 62 is installed on a bottom surface portion of the second recessed portion 82 by using adhesion or the like. An internal space of the second recessed portion 82 of the present embodiment is continuous with an internal space of the first recessed portion 80. The bottom surface portion of the second recessed portion 82 and the bottom surface portion of the first recessed portion 80 of the present embodiment are continuous to be flush with each other.

The second recessed portion 82 includes a circumferential extension portion 82a extending in the circumferential direction when viewed in the axial direction, a first radial extension portion 82b extending in the radial direction from the circumferential extension portion 82a toward the distortion generating portion 44 side, and a second radial extension portion 82c extending in the radial direction from the circumferential extension portion 82a toward the axial through-hole 52 side. Here, for convenience of description, in FIG. 3, the position of each portions is shown by a two-dot chain line. The circumferential extension portion 82a is partially shown. The circumferential extension portion 82a of the present embodiment extends to be continuous in an annular shape, but may be provided in only a part of the circumferential range. The first radial extension portion 82b of the present embodiment is individually provided to correspond to each of the plurality of pillar portions 50. A plurality of first radial extension portions 82b are provided at intervals in the radial direction. The second radial extension portion 82c of the present embodiment is individually provided to correspond to each of the plurality of axial through-holes 52. A plurality of second radial extension portion 82c is provided at intervals in the radial direction.

FIGS. 4 and 5 are referred to. The circuit board 62 includes an annular portion 62a facing one of the first ring portion 40 and the second ring portion 42 in the axial direction, the first protrusion portion 62b protruding in the radial direction from the annular portion 62a, and a second protrusion portion 62c protruding in the radial direction from the annular portion 62a. A mounting surface 62d of the circuit board 62 is mainly provided in the second protrusion portion 62c in addition to the annular portion 62a of the circuit board 62.

The annular portion 62a has an annular shape extending in the circumferential direction. In order to realize this, the annular portion 62a of the present embodiment is continuous in an annular shape, but may be provided in only a part of the circumferential range. The annular portion 62a of the present embodiment faces the second ring portion 42 in the axial direction and is installed on the facing second ring portion 42 by using an adhesive or the like. The annular portion 62a of the present embodiment faces the second recessed portion 82 of the second ring portion 42 in the axial direction. The circuit board 62 is installed on the fixed body 28 in the ring portion 42, which is a location different from the distortion generating portion 44 that is the installation location of the strain sensor 60. The annular portion 62a is accommodated in the circumferential extension portion 82a of the second recessed portion 82 of the fixed body 28.

The first protrusion portion 62b protrudes toward the side of the distortion generating portion 44 of the fixed body 28 in the radial direction with respect to the annular portion 62a. The first protrusion portion 62b of the present embodiment protrudes into the first recessed portion 80, in which the distortion generating portion 44 is located, with respect to the annular portion 62a. The first protrusion portion 62b is accommodated in the first radial extension portion 82b of the second recessed portion 82 in addition to the first recessed portion 80 of the fixed body 28. The substrate electrode 72 is provided at the first protrusion portion 62b. The first protrusion portion 62b is connected to the strain sensor 60 by the conductive connection material 76, as described above.

The second protrusion portion 62c protrudes to the same side as the first protrusion portion 62b in the radial direction with respect to the annular portion 62a. The second protrusion portion 62c is provided at a location overlapping the internal space of the axial through-hole 52 of the fixed body 28 when viewed in the axial direction. The second protrusion portion 62c protrudes from the annular portion 62a of the circuit board 62 to be located between the pillar portions 50 adjacent to each other when viewed in the axial direction. The second protrusion portion 62c protrudes in the radial direction more than the first protrusion portion 62b with respect to the annular portion 62a. The second protrusion portion 62c is partially accommodated in the second radial extension portion 82c (refer to FIG. 3) of the second recessed portion 82 of the fixed body 28.

The effects of the features described above will be described.

(B) The distortion generating portion 44 includes the first recessed portion 80 that accommodates the strain sensor 60. Therefore, the strain sensor 60 can be made less likely to interfere with other members as compared to a case where the first recessed portion 80 is not provided in the distortion generating portion 44.

(C) The second ring portion 42 of the fixed body 28 includes the second recessed portion 82 that accommodates the circuit board 62. Therefore, the circuit board 62 can be made less likely to interfere with the other member as compared to a case where the second recessed portion 82 is not provided in the second ring portion 42. This effect can also be obtained in a case where the second recessed portion 82 is provided in the first ring portion 40 instead of the second ring portion 42.

(D) The circuit board 62 includes the first protrusion portion 62b that protrudes into the first recessed portion 80 of the fixed body 28 and is electrically connected to the strain sensor 60. Therefore, compared to a case where the circuit board 62 does not include the first protrusion portion 62b, the first protrusion portion 62b serving as a part of the circuit board 62 can be present near the strain sensor 60 in the first recessed portion 80. As a result, the circuit board 62 and the strain sensor 60 are easily electrically connected to each other by using the first protrusion portion 62b.

(E) The circuit board 62 includes the annular portion 62a facing the second ring portion 42 in the axial direction, and the first protrusion portion 62b that protrudes in the radial direction from the annular portion 62a and is connected to the strain sensor 60. Therefore, compared to a case where the circuit board 62 does not include the first protrusion portion 62b, the first protrusion portion 62b serving as a part of the circuit board 62 can be present near the strain sensor 60 installed in the distortion generating portion 44 of the fixed body 28. As a result, the circuit board 62 and the strain sensor 60 are easily connected to each other by using the first protrusion portion 62b. This effect can also be obtained in a case where, instead of the second ring portion 42, the first ring portion 40 faces the annular portion 62a of the circuit board 62 in the axial direction.

(F) The circuit board 62 includes the second protrusion portion 62c that protrudes to be located between the pillar portions 50, which are adjacent to each other, of the fixed body 28. Therefore, a part of the circuit board 62 can also be present between the pillar portions 50, which are adjacent to each other, of the fixed body 28, and accordingly, it is advantageous to an increase in the area of the mounting surface 62d on which the circuit element 70 is mounted.

FIGS. 3 and 5 are referred to. The fixed body 28 includes the reinforcement portion 90 provided at the pillar portion 50. The reinforcement portion 90 of the present embodiment is provided to be paired at each of the circumferential side surfaces of the pillar portion 50. The reinforcement portion 90 is configured by a protrusion portion that protrudes outward in the axial direction in the pillar portion 50. The reinforcement portion 90 is provided to reinforce the pillar portion 50. The reinforcement portion 90 of the present embodiment is provided to suppress bending strain of the pillar portion 50 by increasing the stiffness of the pillar portion 50 against bending deformation. The terms, bending deformation and bending strain, as referred to herein refer to deformation and strain caused by a moment load acting to tilt the rotation center line of the output body 32. In this way, it is advantageous to accurate detection of the torque by using an electrical signal indicating the shear strain of the distortion generating portion 44. In order to realize this, the reinforcement portion 90 of the present embodiment includes a radial extension portion 90a provided at a circumferential side portion of the pillar portion 50 and extending in the radial direction. In addition, the reinforcement portion 90 of the present embodiment includes a circumferential extension portion 90b extending in the circumferential direction from the end portion of the radial extension portion 90a provided at the ring portion 42. The circumferential extension portion 90b extends from the end portion of the radial extension portion 90a toward the outer side in the circumferential direction with respect to the pillar portion 50 in which the reinforcement portion 90 is provided.

The reinforcement portion 90 of the present embodiment protrudes in the axial direction from the bottom surface portions of the first and second recessed portions 80 and 82. The radial extension portion 90a of the reinforcement portion 90 partially forms the first recessed portion 80 and the first radial extension portion 82b of the second recessed portion 82. The circumferential extension portion 90b of the reinforcement portion 90 partially forms the circumferential extension portion 82a of the second recessed portion 82.

The reinforcement portion 90 described above is provided to be paired at each of the pair of the circumferential side portions 52a of the axial through-hole 52. The pair of reinforcement portions 90 are interrupted in the outer radial side portion 52c, which is located on the second recessed portion 82 side of the fixed body 28 in the radial direction with respect to the axial through-hole 52, out of the pair of radial side portions 52b and 52c of the axial through-hole 52. In FIG. 3, a location S1 where the pair of reinforcement portions 90 are interrupted is shown by a two-dot chain lines. The term "interrupted" as referred to herein means that the pair of reinforcement portions 90 are not continuous in the radial side portion 52c in question when viewed in the axial direction, and are provided at an interval. The second radial extension portion 82c that is a part of the second recessed portion 82 is provided at the radial side portion 52c of the axial through-hole 52, which is located at the location S1 where the pair of reinforcement portions 90 are interrupted. The second protrusion portion 62c of the circuit board 62 protrudes to be located between the pillar portions 50 adjacent to each other, while passing through the location S1 where the pair of reinforcement portions 90 are interrupted, when viewed in the axial direction.

> (G) In this way, the location S1 where the pair of reinforcement portions 90 are interrupted can be used as a disposition space for the circuit board 62 that is accommodated in the second recessed portion 82 of the fixed body 28, and thus it is advantageous to an increase in the area of the mounting surface on which the circuit element 70 is mounted. In addition, the pillar portion 50 of the fixed body 28 can be reinforced by the pair of reinforcement portions 90 while securing the disposition space for the circuit board 62 in this way.

FIG. 1 is referred to. A main bearing 92 is disposed between the fixed body 28 and the output body 32. The main bearing 92 of the present embodiment is disposed between the casing 22 and the internal gear 18. In addition, the main bearing 92 may be disposed between the casing 22 and the asynchronous carrier 24. The main bearing 92 can transmit the moment load input from the driven member 30 to the output body 32 to the fixed body 28. In order to realize this, the main bearing 92 of the present embodiment is configured by a cross roller bearing, but may be configured by a four-point contact ball bearing or the like. In addition, in order to realize this, a plurality of main bearings 92 may be provided at intervals in the axial direction. In this case, the main bearing 92 may be configured by various bearings such as a deep groove ball bearing and an angular ball bearing.

The fixed body 28 includes the fixation portions 46 and 94 that are fixed to the external member 26. The fixation portions 46 and 94 include a second fixation portion 94 that is provided in the casing 22, in addition to the first fixation portion 46 that is provided in the second ring portion 42 of the synchronous carrier 20. The first fixation portion 46 of the synchronous carrier 20 and the second fixation portion 94 of the casing 22 of the present embodiment are fixed to the external member 26 by the common fixture 48. The second fixation portion 94 of the casing 22 has a second through-hole 94a which is formed at a location overlapping the first through-hole 46a in the axial direction, and through which the fixture 48 passes.

The speed reducer 10 is provided with a load transmission pathway 96 extending from the output body 32 to the external member 26 via the main bearing 92 and the fixed body 28. Here, a part of the load transmission pathway 96 is shown by an arrow. The load transmission pathway 96 can transmit the load input from the driven member 30 to the output body 32 to the external member 26. The "load" mainly assumes a moment load, but may include an axial load or a radial load. In the present embodiment, in addition to the second fixation portion 94 of the casing 22 of the fixed body 28, the first fixation portion 46 of the second ring portion 42 of the synchronous carrier 20 is provided on the load transmission pathway 96.

The distortion generating portion 44 of the fixed body 28 is provided at a location different from the load transmission pathway 96. In addition to the distortion generating portion 44, the first ring portion 40 of the fixed body 28 is also provided at a location different from the load transmission pathway 96. The distortion generating portion 44 is provided at a location different from the load transmission pathway 96 for transmitting a moment load, even though torque is transmitted from the first ring portion 40 during the operation of the speed reducer 10. In order to satisfy this condition, the distortion generating portion 44 of the present embodiment is provided in a part of the synchronous carrier 20 which is integrated with the casing 22, and to which torque is transmitted from the external gear 16 via the pin 36. In integrating the casing 22 and the synchronous carrier 20 in this way, the second ring portion 42 of the synchronous carrier 20 may be directly fixed to the external member 26, as in the present embodiment, or may be fixed to the external member 26 via the casing 22 directly fixed to the external member 26. In addition, in providing the distortion generating portion 44 at a location different from the load transmission pathway 96, the distortion generating portion 44 of the present embodiment is provided at a position shifted inward in the radial direction with respect to the second ring portion 42 fixed to the external member 26.

When a moment load acts on the distortion generating portion 44 of the fixed body 28 to increase the bending strain occurred in the distortion generating portion 44, it is known that this causes a decrease in detection accuracy in detecting the torque by using the electrical signal of the strain sensor 60 indicating the shear strain of the distortion generating portion 44. The distortion generating portion 44 of the fixed body 28 is provided at a location different from the load transmission pathway 96 through which the moment load that causes such a decrease in detection accuracy is transmitted. In this way, it is difficult for bending strain to occur in the distortion generating portion 44, which is advantageous to accurate detection of the torque, as described above.

Another Embodiment

Figure 7:
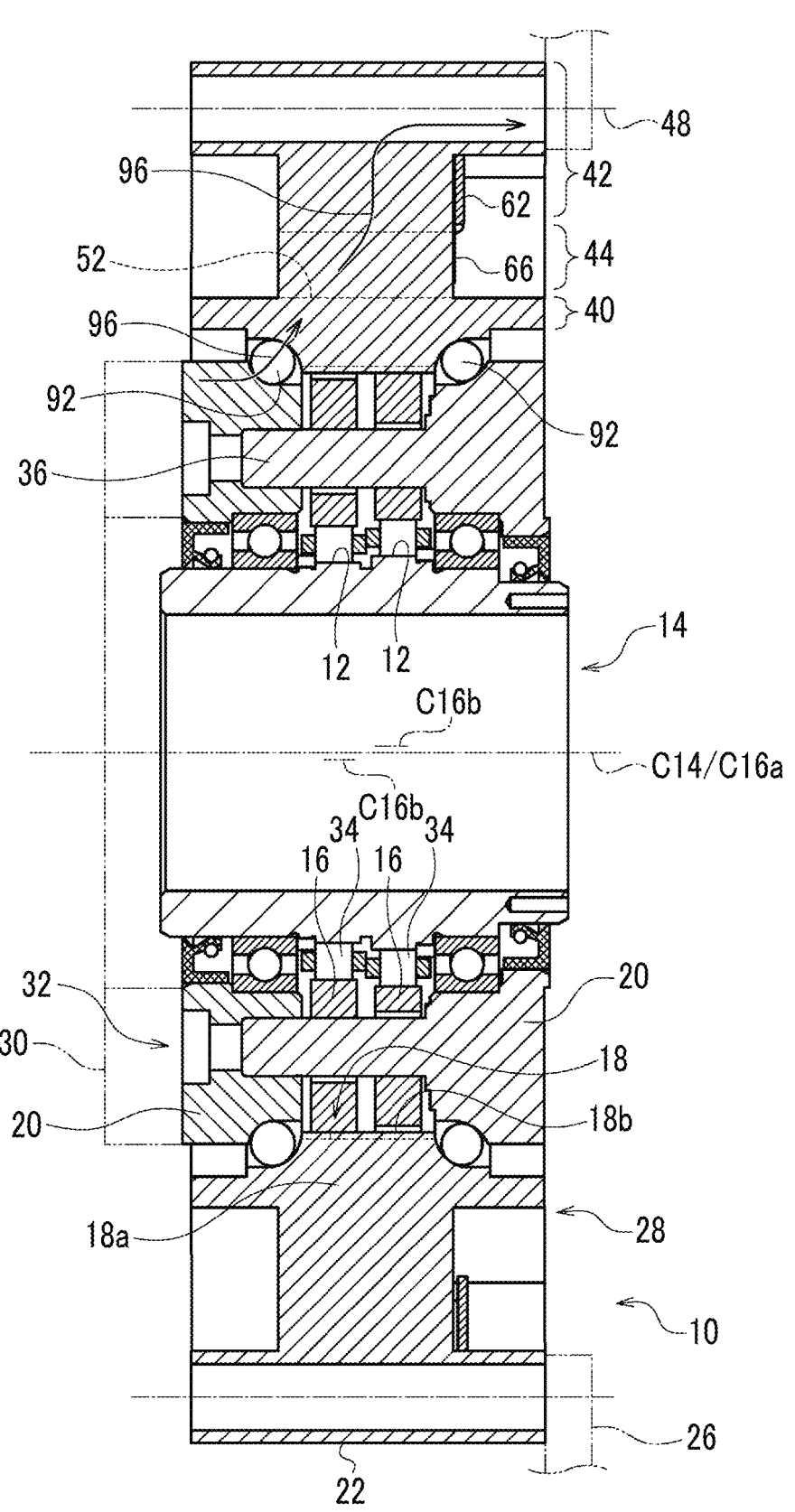
FIG. 7 is a side sectional view showing an eccentric oscillation type speed reducer according to another embodiment.

FIG. 7 is referred to. In the subsequent embodiments, the same contents as those in one embodiment are applied to components that are not described below, among the components described in one embodiment.

In the speed reducer 10 of the embodiment of FIG. 1, the casing 22 and the internal gear 18 are provided separately. In contrast, the speed reducer 10 of the present embodiment is different in that the casing 22 and the internal gear 18 are integrated with each other. In order to satisfy this condition, at least the internal gear main body 18a among the internal gear main body 18a and the plurality of inner teeth 18b configuring the internal gear 18 may be integrated with the casing 22.

In the speed reducer 10 of the embodiment of FIG. 1, the synchronous carrier 20 and the asynchronous carrier 24 are provided on both sides of the external gear 16 in the axial direction. In contrast, in the speed reducer 10 of the present embodiment, a pair of synchronous carriers 20 are provided on both sides of the external gear 16 in the axial direction. The synchronous carriers 20 are connected to each other via the pin 36, and both of the synchronous carriers 20 can be synchronized with the axial rotation component of the external gear 16.

The fixed body 28 of the embodiment of FIG. 1 is configured by the synchronous carrier 20 and the casing 22, and the output body 32 is configured by the asynchronous carrier 24 and the internal gear 18. In contrast, the fixed body 28 of the present embodiment is configured by the internal gear 18 and the casing 22, and the output body 32 is configured by each of the synchronous carriers 20. Unlike the form in FIG. 1, a pair of main bearings 92 are disposed at an interval in the axial direction between the output body 32 and the fixed body 28. Each of the pair of main bearings 92 is disposed between the individual synchronous carrier 20 and the casing 22.

The first and second ring portions 40 and 42 and the distortion generating portion 44 of the fixed body 28 according to the present embodiment are provided in the casing 22 integrated with the internal gear 18. These are provided in a single member configuring the casing 22, as in the embodiment of FIG. 1. The first ring portion 40 of the fixed body 28 configures an inner ring portion, and the second ring portion 42 configures an outer ring portion. A plurality of inner teeth 18b are provided in the inner peripheral portion of the first ring portion 40 of the present embodiment. In addition, the main bearing 92 is disposed in the inner peripheral portion of the first ring portion 40 of the present embodiment. In a case where the internal gear 18 serves as at least a part of the fixed body 28, as in the present embodiment, the torque transmitted from the inner teeth 18b of the internal gear 18 is input to the first ring portion 40 of the fixed body 28.

Figure 8:
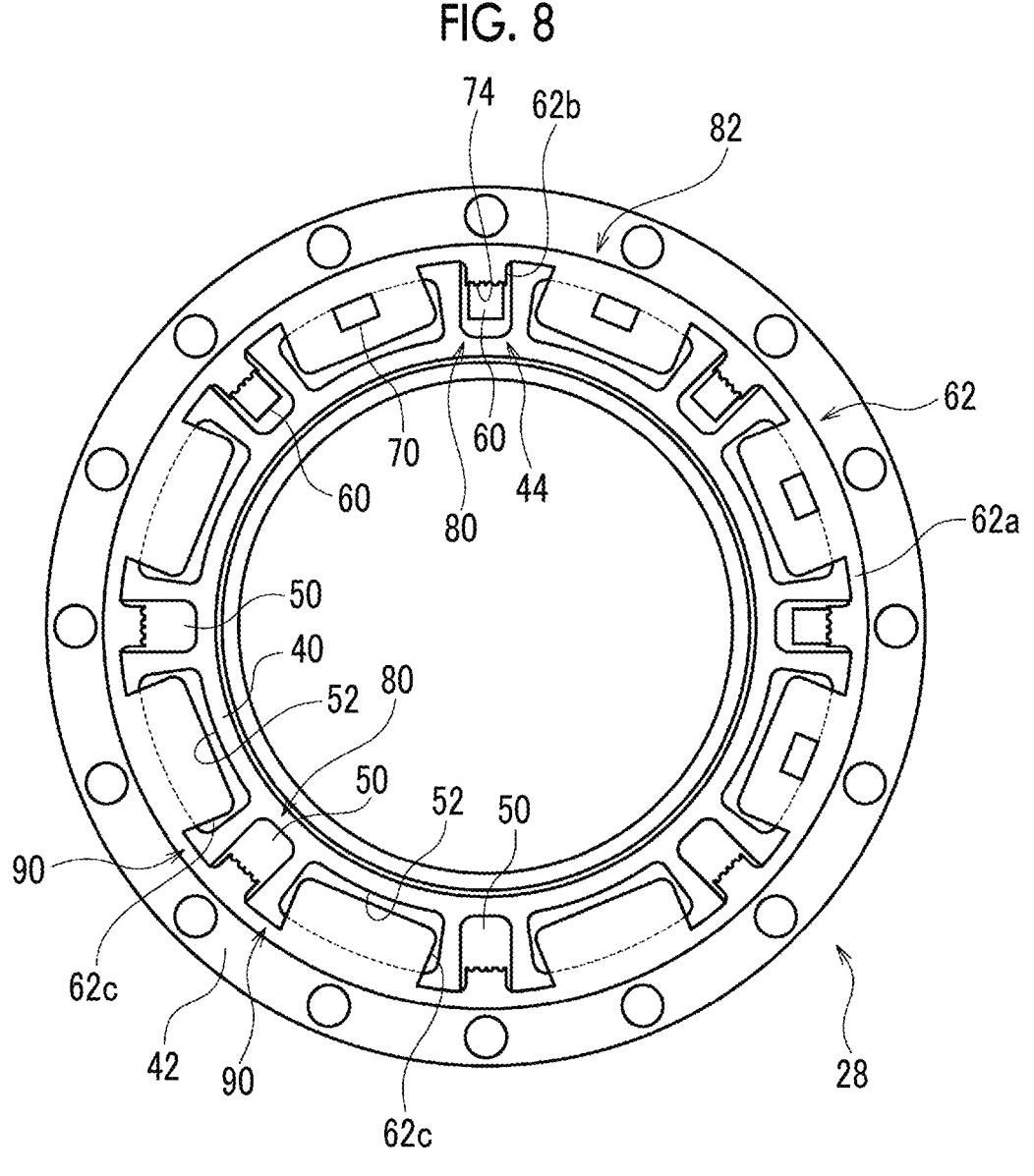
FIG. 8 is a view showing the eccentric oscillation type speed reducer of another embodiment as viewed from the same viewpoint as that in FIG. 4.

FIG. 8 is referred to. The distortion generating portion 44 of the fixed body 28 of the present embodiment also includes the first recessed portion 80 that accommodates the strain sensor 60. In addition, the second ring portion 42 of the fixed body 28 of the present embodiment also includes the second recessed portion 82 that accommodates the circuit board 62. The circuit board 62 of the present embodiment also includes the first protrusion portion 62b that protrudes into the first recessed portion 80 of the fixed body 28.

In this manner, the speed reducer 10 of the present embodiment includes the components described in (A) to (E) described above, and it is possible to obtain the effects corresponding to the description thereof. In addition, the speed reducer 10 of the present embodiment has the feature regarding the reinforcement portion 90 of the fixed body 28 of (G), in addition to the second protrusion portion 62c of the circuit board 62 of (F) described above, and it is possible to obtain the effects corresponding to the description thereof.

In the speed reducer 10 of the present embodiment, unlike one embodiment, the distortion generating portion 44 of the fixed body 28 is provided in the load transmission pathway 96 extending from the output body 32 to the external member 26 via the main bearing 92 and the fixed body 28. In this case, unlike one embodiment, the moment load is transmitted to the distortion generating portion 44 of the fixed body 28, and thus, a decrease in detection accuracy may be caused in detecting the torque by using the electrical signal of the strain sensor 60 that indicates the shear strain of the distortion generating portion 44. As a countermeasure to this, various methods including a known method may be adopted to suppress the influence of the bending strain occurred in the distortion generating portion 44.

As the method, for example, a dedicated strain sensor for detecting a bending strain occurred in the fixed body 28 may be installed in the fixed body 28. In this case, the bending strain component included in the electrical signal of the strain sensor 60 may be reduced by correcting the electrical signal of the strain sensor 60 indicating the shear strain of the distortion generating portion 44, based on the electrical signal of the dedicated strain sensor indicating the bending strain of the distortion generating portion 44.

In addition, as the method, by installing the individual strain sensor 60 on each of both sides in the axial direction of the distortion generating portion 44 of the fixed body 28 and disposing the individual strain sensor 60 on the opposite side of the bridge circuit, the bending strain component included in the electrical signal of the individual strain sensors 60 may be canceled.

In addition to this, a machine learning model may be used to suppress the influence of the bending strain component included in the electrical signal of the strain sensor 60. The machine learning model is trained to output torque in which the influence of a bending strain component included in the electrical signal of the strain sensor 60 is reduced, in a case where the electrical signal of the strain sensor 60 indicating the shear strain of the distortion generating portion 44 is input. The machine learning model is, for example, a neural network such as an artificial neuronal network (ANN).

Further Embodiment

Figure 9:
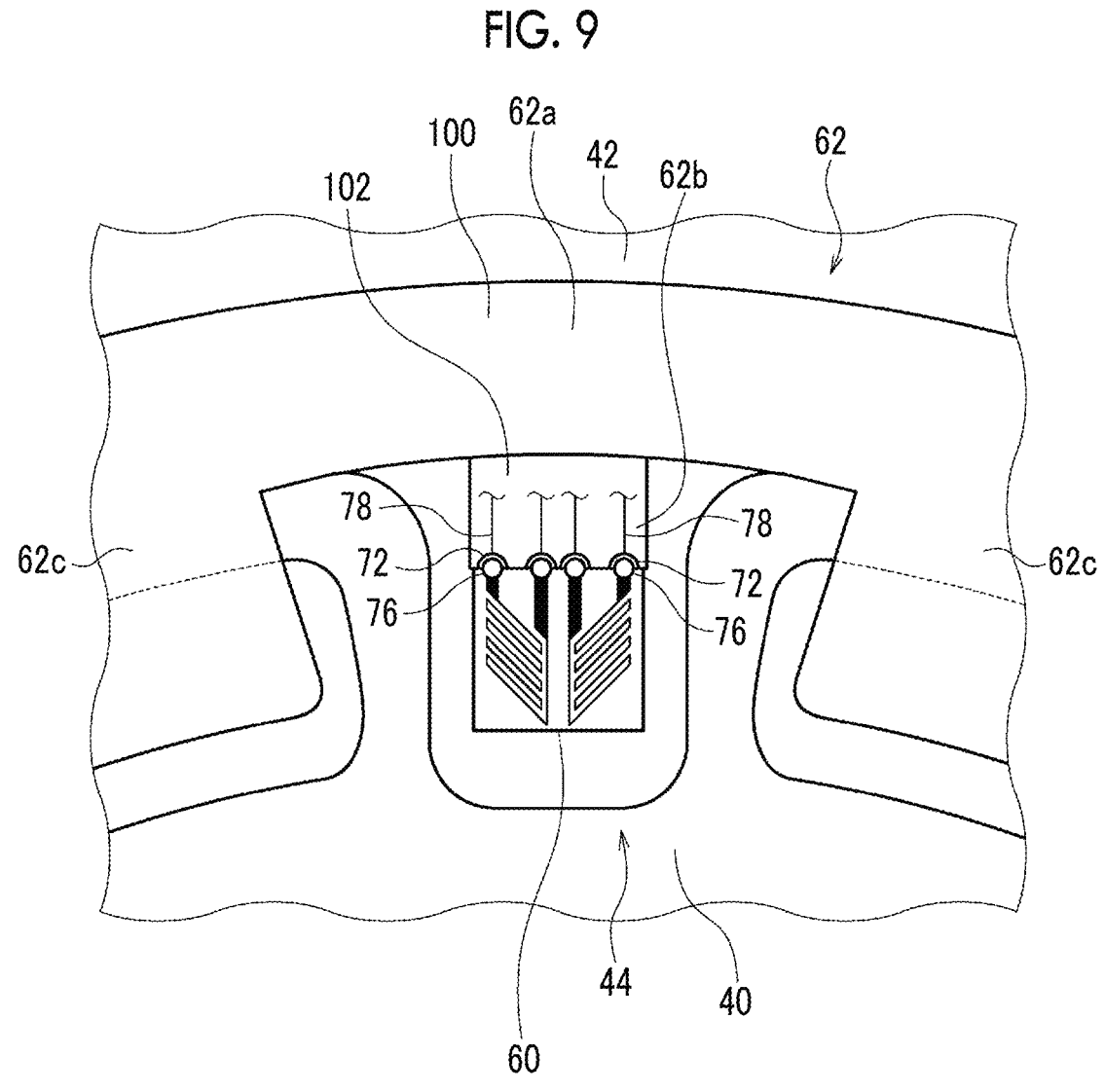
FIG. 9 is a view showing an eccentric oscillation type speed reducer of further embodiment as viewed from the same viewpoint as that in FIG. 6.

FIG. 9 is referred to. The entire circuit board 62 of one embodiment is configured by a rigid substrate. The annular portion 62a of the circuit board 62 of the present embodiment is configured by a rigid substrate 100, and the first protrusion portion 62b is configured by a flexible substrate 102. The flexible substrate 102 is connected to the rigid substrate 100 by various connection methods including a known method. The second protrusion portion 62c is configured by the rigid substrate 100 that is common to the annular portion 62a, but may be configured by the flexible substrate 102. In addition, both the annular portion 62a and the first protrusion portion 62b of the circuit board 62 may be configured by the flexible substrate 102.

When the distortion generating portion 44 is deformed more than each of the ring portions 40 and 42 by the torque acting on the fixed body 28, the strain sensor 60 installed in the distortion generating portion 44 and the circuit board 62 installed in the ring portion 42 try to relatively move in the circumferential direction. The flexible substrate 102 can be flexibly deformed to follow the relative movement between the circuit board 62 and the strain sensor 60. In this case, the flexible substrate 102 of the present embodiment is mainly shear-deformable in the circumferential direction, but is also deformable in the axial direction. Although not shown in the drawing, the flexible substrate 102 is provided at a slight interval with respect to the axial side surface of the fixed body 28 to allow flexible deformation of the flexible substrate 102 itself, and is not fixed to the fixed body 28 by an adhesive or the like. In contrast, the annular portion 62*a* of the circuit board 62 configured by the rigid substrate 100 is fixed to the ring portion 42 of the fixed body 28 by an adhesive or the like.

In this way, when the strain sensor 60 and the circuit board 62 try to relatively move in the circumferential direction, the flexible substrate 102 is deformed, so that it is possible to avoid a situation where a local large load acts on the connection location between the strain sensor 60 and the circuit board 62, and the conductive connection material 76. As a result, the occurrence of a connection failure can be suppressed in which the strain sensor 60 and the circuit board 62 are not electrically connected to each other due to the separation of the sensor electrode 66 of the strain sensor 60 or the substrate electrode 72 of the circuit board 62 from the conductive connection material 76. This connection failure may occur, for example, when the conductive connection material 76 is destroyed by a local large load.

In addition, when heat expansion occurs in the distortion generating portion 44 of the fixed body 28 or vibration is input to the distortion generating portion 44, the strain sensor 60 installed in the distortion generating portion 44 may be displaced with respect to the rigid substrate 100 of the circuit board 62. In this case, the flexible substrate 102 of the circuit board 62 is flexibly deformed, so that a situation in which a large load acts on the connection location between the circuit board 62 and the conductive connection material 76 can be avoided. In addition, the flexible substrate 102 has a smaller thickness in the axial direction than the rigid substrate 100. Therefore, the axial dimension from the main surface on the axial outer side of the circuit board 62 (the main surface of the flexible substrate 102) to the main surface of the strain sensor 60 can be reduced. In this way, there is also the advantage that the conductive connection material 76 is easily provided to cover the sensor electrode 66 located on the main surface of the strain sensor 60 while covering the main surface side portion of the substrate electrode 72 located on the main surface of the circuit board 62.

Next, modification forms of each component described so far will be described.

As a specific type of the eccentric oscillation type speed reducer 10, a center crank type in which the crankshaft 14 is disposed on the oscillation center C16*a* of the external gear 16 has been described. The specific type is not particularly limited, and for example, a distribution type in which a plurality of crankshafts 14 are disposed at positions offset in the radial direction from the oscillation center C16*a* of the external gear 16 may be adopted.

In one embodiment, the fixed body 28 is configured by at least the synchronous carrier 20, and the output body 32 is configured by at least the internal gear 18. In addition, in another embodiment, the fixed body 28 is configured by at least the internal gear 18, and the output body 32 is configured by the synchronous carrier 20. In this manner, one of the internal gear 18 and the synchronous carrier 20 may configure at least a part of the fixed body 28, and the other of the internal gear 18 and the synchronous carrier 20 may configure at least a part of the output body 32.

In a case where one of the internal gear 18 and the synchronous carrier 20 configures at least a part of the fixed body 28, the presence or absence of the other component of the fixed body 28 is not limited, and a specific example of the component is not particularly limited. Similarly, in a case where the other of the internal gear 18 and the synchronous carrier 20 configures at least a part of the output body 32, the presence or absence of the other component of the output body 32 is not limited, and a specific example of the component is not particularly limited.

An example has been described in which the first ring portion 40 of the fixed body 28 configures an inner ring portion and the second ring portion 42 configures an outer ring portion. Instead of this, the first ring portion 40 may configure an outer ring portion, and the second ring portion 42 may configure an inner ring portion.

The distortion generating portion 44 of the fixed body 28 does not need to include the first recessed portion 80. Both the first and second ring portions 40 and 42 of the fixed body 28 do not need to include the second recessed portion 82. Instead of the second ring portion 42 of the fixed body 28, the first ring portion 40 may include the second recessed portion 82.

The circuit board 62 does not need to include each of the first protrusion portion 62*b* and the second protrusion portion 62*c*, and may include only one of them. In addition, the number of the first protrusion portions 62*b* and the number of the second protrusion portions 62*c* are not particularly limited.

The pair of reinforcement portions 90 do not need to be interrupted at the radial side portion, which is located on the second recessed portion 82 side of the circuit board 62 in the radial direction, out of the pair of radial side portions 52*b* and 52*c* of the axial through-hole 52.

In providing the distortion generating portion 44 of the fixed body 28 at a location different from the load transmission pathway 96 described above, at least a part of the fixed body 28 does not need to be configured by the synchronous carrier 20 and the casing 22, as in one embodiment.

The above embodiments and modification forms are exemplification. The technical ideas that abstract these examples should not be construed to be limited to the contents of the embodiments and modification forms. Many design changes such as change, addition, and deletion of components can be made in the contents of the embodiments and modification forms. In the embodiments described above, the content in which such a design changes can be made is emphasized by adding a notation "embodiment". However, design changes are allowed even in a content in which there is no such notation. The hatching made in the cross section of the drawing does not limit the material of the object in which the hatching is made.

Any combination of the components described above is also effective. For example, any description item of another embodiment may be combined with an embodiment, or any description item of an embodiment and another modification form may be combined with a modification form. A component configured with a single member in an embodiment may be configured with a plurality of members. Similarly, a component configured with a plurality of members in an embodiment may be configured with a single member.

It should be understood that the invention is not limited to the above-described embodiment, but may be modified into various forms on the basis of the spirit of the invention. Additionally, the modifications are included in the scope of the invention.

What is claimed is:

1. An eccentric oscillation type speed reducer comprising:
   an eccentric body;
   an external gear capable of being oscillated by the eccentric body;

an internal gear that meshes with the external gear;

a carrier capable of being synchronized with an axial rotation component of the external gear; and a circuit board to which a strain sensor is electrically connected, wherein one of the internal gear and the carrier configures at least a part of a fixed body that is fixed to an external member, the fixed body includes a first ring portion, a second ring portion that is provided to be separated from the first ring portion in a radial direction and is fixed to the external member, and a distortion generating portion provided between the first ring portion and the second ring portion, the strain sensor is installed in the distortion generating portion, the distortion generating portion includes a first recessed portion that accommodates the strain sensor, and the circuit board includes a first protrusion portion that protrudes into the first recessed portion and is connected to the strain sensor.

2. The eccentric oscillation type speed reducer according to claim 1, wherein the first protrusion portion and the strain sensor are electrically connected to each other via a conductive connection material, and the first protrusion portion is configured by a flexible substrate.

3. An eccentric oscillation type speed reducer comprising:

an eccentric body;

an external gear capable of being oscillated by the eccentric body;

an internal gear that meshes with the external gear;

a carrier capable of being synchronized with an axial rotation component of the external gear; and a circuit board to which a strain sensor is electrically connected, wherein one of the internal gear and the carrier configures at least a part of a fixed body that is fixed to an external member, the fixed body includes a first ring portion, a second ring portion that is provided to be separated from the first ring portion in a radial direction and is fixed to the external member, and a distortion generating portion provided between the first ring portion and the second ring portion, the strain sensor is installed in the distortion generating portion, and one of the first ring portion and the second ring portion includes a second recessed portion that accommodates at least a part of the circuit board.

4. An eccentric oscillation type speed reducer comprising:

an eccentric body;

an external gear capable of being oscillated by the eccentric body;

an internal gear that meshes with the external gear;

a carrier capable of being synchronized with an axial rotation component of the external gear; and a circuit board to which a strain sensor is electrically connected, wherein one of the internal gear and the carrier configures at least a part of a fixed body that is fixed to an external member, the fixed body includes a first ring portion, a second ring portion that is provided to be separated from the first ring portion in a radial direction and is fixed to the external member, and a distortion generating portion provided between the first ring portion and the second ring portion, the strain sensor is installed in the distortion generating portion, and the circuit board includes an annular portion that faces one of the first ring portion and the second ring portion in an axial direction, and a first protrusion portion that protrudes in the radial direction from the annular portion and is electrically connected to the strain sensor.

5. An eccentric oscillation type speed reducer comprising:

an eccentric body;

an external gear capable of being oscillated by the eccentric body;

an internal gear that meshes with the external gear;

a carrier capable of being synchronized with an axial rotation component of the external gear; and a circuit board to which a strain sensor is electrically connected, wherein one of the internal gear and the carrier configures at least a part of a fixed body that is fixed to an external member, the fixed body includes a first ring portion, a second ring portion that is provided to be separated from the first ring portion in a radial direction and is fixed to the external member, and a distortion generating portion provided between the first ring portion and the second ring portion, the strain sensor is installed in the distortion generating portion, the distortion generating portion includes a plurality of pillar portions provided at intervals in a circumferential direction, and the circuit board includes a second protrusion portion that protrudes to be located between the pillar portions adjacent to each other when viewed in an axial direction.

6. The eccentric oscillation type speed reducer according to claim 5, wherein the fixed body includes an axial through-hole formed between the pillar portions adjacent to each other, and a pair of reinforcement portions each provided at each of a pair of circumferential side portions of the axial through-hole, one of the first ring portion and the second ring portion includes a second recessed portion that accommodates at least a part of the circuit board, and the pair of reinforcement portions are interrupted in a radial side portion of the axial through-hole, which is located on a second recessed portion side with respect to the axial through-hole in the radial direction.

7. An eccentric oscillation type speed reducer comprising:

an eccentric body;

an external gear capable of being oscillated by the eccentric body;

an internal gear that meshes with the external gear;

a carrier capable of being synchronized with an axial rotation component of the external gear; and a casing provided outside the external gear in a radial direction, wherein one of the internal gear and the carrier configures at least a part of a fixed body that is fixed to an external member, the fixed body includes a first ring portion, a second ring portion that is provided to be separated from the first ring portion in the radial direction and is fixed to the external member, and a distortion generating portion provided between the first ring portion and the second ring portion, a strain sensor is installed in the distortion generating portion, the other of the internal gear and the carrier configures at least a part of an output body that outputs rotation, a main bearing is disposed between the output body and the fixed body, the distortion generating portion is provided at a location different from a load transmission pathway extending from the output body to the external member via the main bearing and the fixed body, at least a part of the fixed body is configured by the casing and the carrier, and the distortion generating portion is provided in the carrier.

\* \* \* \* \*